United States Patent [19]

Smyth

[11] 3,864,325

[45] Feb. 4, 1975

[54] ($N^{AL}$, $N^{BL}$, $N^{B29}$, CARBAMOYL)-($O^{A14}$, $O^{B16}$, $O^{B26}$ARYL) INSULIN DERIVATIVES

[75] Inventor: Derek George Smyth, Stanmore, England

[73] Assignee: National Research Development Corporation, London, England

[22] Filed: Nov. 13, 1972

[21] Appl. No.: 306,369

Related U.S. Application Data

[63] Continuation-in-part of Ser. No. 221,061, Jan. 26, 1972, abandoned.

[30]    Foreign Application Priority Data

Nov. 18, 1971  Great Britain.................... 53622/71
Nov. 18, 1971  Great Britain.................... 53623/71

[52] U.S. Cl................................ 260/112.7, 424/178
[51] Int. Cl... C07c 103/52, C07g 7/00, A61k 17/02
[58] Field of Search...................... 260/112.7, 112.5

[56]          References Cited
            UNITED STATES PATENTS 3,481,917  12/1969  Grant et al...................... 260/112.7
3,528,960  9/1970   Haas................................ 260/112.7
3,684,791  8/1972   Geiger et al..................... 260/112.7

*Primary Examiner*—Lewis Gotts
*Assistant Examiner*—Reginald J. Suyat

[57]              ABSTRACT

Insulin derivatives which have an improved profile of hypoglycaemic activity, or which are intermediates for the production of such derivatives, are those in which at least one of the $A_1$(glycine, $B_1$(phenylalanine) and $B_{29}$ (lysine) amino acid units is blocked by a carbamyl group or a substituted carbamyl group $R_1R_2NCO$— wherein $R_1$ and $R_2$ can be hydrogen, alkyl, aryl or other radicals.

Masking of the initial activity is achieved by blocking tryosine hydroxyl groups with substituents which are releasable in vivo. N, N', N''- tricarbamyl and -triethylcarbamyl insulin, and O-substituted derivatives thereof are typical compounds of the invention.

10 Claims, No Drawings

($N^{AL}$, $N^{BL}$, $N^{B29}$, CARBAMOYL)-($O^{A14}$, $O^{B16}$, $O^{B26}$ARYL) INSULIN DERIVATIVES

The present application is a continuation-in-part derived from my copending application Ser. No. 221,061, filed 26th Jan., 1972 now abandoned.

This invention relates to insulin derivatives.

As more comprehensive methods of detection of diabetes mellitus are introduced and as the normal expectation of life becomes longer the recorded incidence of this disease is increasing steadily. Present treatment consists of dietary control usually in combination with insulin injections or with an oral antidiabetic drug, and frequently injections once or twice daily are necessary throughout the life of the patient. Even with such treatment the patient's blood sugar level varies considerably from normal necessitating a strict diet. Oral drugs are suitable only in mild cases of diabetes and are now considered to have certain undesirable side effects. In addition to the above mentioned disadvantages of present treatment, a proportion of diabetics produce antibodies to insulin and become increasingly resistant to its action.

It is desirable to produce therapeutic agents which provide better control of blood sugar level than those used in present methods of treatment. To this end, research has been pursued into the properties of insulin derivatives, a field in which in spite of the efforts of many investigators few definite conclusions have emerged hitherto, due largely to failure to separate and adequately identify the individual components of the complex mixture which results from acylation and other reactions to which the parent insulins have been subjected. Our approach is directed towards the development of a range of derivatives in which the combination of substituent groups is such as to give rise to an improved profile of hypoglycaemic effect. In order to achieve this aim the type of substitution at the primary amino groups of the insulin molecule is of the greatest importance.

It is the object of this invention to produce an N-substituted insulin in which the profile of the hypoglycaemic effect may be modified but which retains appreciably the desired activity of the parent insulin. Further substitution of the molecule of the N-substituted insulins may also be explored in order to achieve temporary masking of the hypoglycaemic effect. Substitution of the amino groups also modifies the antigenic properties of the molecule and can reduce the incidence of immunological resistance.

According to this invention an insulin derivative meeting the above requirements to a marked extent is one in which at least one of the $A_1$ (glycine), $B_1$ (phenylalanine) and $B_{29}$ (lysine) amino groups is blocked by a carbamyl group, $NH_2CO$—, or a substituted carbamyl group, $R_1R_2NCO$—, wherein $R_1$ and $R_2$ can be hydrogen, alkyl, aryl or other radicals. Among the compounds in which $R_1$ is hydrogen and $R_2$ is a lower alkyl group ($C_1$ to $C_4$), those in which N-ethylcarbamyl is the blocking group are of particular interest.

Introduction of carbamyl or substituted carbamyl groups in accordance with the invention may conveniently be effected by reacting the insulin with an alkali metal cyanate, e.g. KCNO, for carbamylation and with an alkyl isocyanate, e.g. $C_2H_5NCO$ or PhNCO, for N-substituted carbamylation.

The blocking of one or more of the amino groups recited above, conveniently including that at the $A_1$ (glycine) position, and preferably of all three groups has been found to be a necessary condition for the production of compounds having the required properties. Thus N,N',N''-tricarbamyl insulin, for example, has been found to have outstanding properties, its potency in the guinea-pig as assessed by effect on blood glucose by peak response and area under the curve being double that of unmodified insulin. As indicated, at least one of the N-blocking groups must be carbamyl but alternatives are possible for the other N-blocking groups.

Modification of the hypoglycaemic effect of the N-substituted insulins can be achieved by additional substitution, namely at one or more tyrosine hydroxyl sites ($A_{14}$, $A_{19}$, $B_{16}$, $B_{26}$), and insulin derivatives containing O-acyl groups at one or more tyrosine residues in addition to the N-carbamyl or N-substituted carbamyl groups are also envisaged in accordance with this invention. Such O-substituted derivatives are of most interest in the case of the N-trisubstituted insulins. As O-acylation almost invariably results in an inactive derivative, it is essential, for activity to be expressed, that the O-blocking group should be removed in vivo. Therefore the choice of blocking reagent will be determined by the desired degree of stability of the blocked hydroxyl groups. Acetyl and glutaryl groups, for example, are for these reasons preferred to succinyl groups. Furthermore, there are four tyrosine residues in the insulin molecule and both partial and complete tyrosine blocking are within the scope of this invention. Tyrosine acylation or other forms of blocking may be readily monitored by measuring the decrease in the characteristic tyrosine absorption peak at about 275 millimicrons. For example an N-tri-substituted derivative can be acylated incrementally and the reaction terminated when the reduction in absorption indicates that the desired degree of substitution has taken place.

Various reagents may be used to effect the acylation. Suitably active systems comprising the carboxylic acid or functional derivatives thereof include the acid in the presence of carbodi-imide reagents, the acid chloride or anhydride, or activated esters such as those with p-nitrophenol and hydroxysuccinicimide.

Alternatives to acylation are possible for the blocking of hydroxyl groups, e.g. carbamylation or N-substituted carbamylation. The methods and groups used will be determined partly by consideration of ease of isolation of the products but chiefly with reference to the ease of removal of the group or groups in vivo; the latter may be readily tested for by in vitro hydrolysis experiments which simulate physiological conditions thereby enabling tailoring of the final product to the requirements of particular patients.

Certain of the N-carbamylated O-acylated derivatives in accordance with this invention have been found to be subject to attack by naturally occurring esterases and therefore further variation in the nature of the O-acyl group may be necessary in certain cases. Thus, O-chloracetyl derivatives may be produced by chloracetic anhydride and ethoxycarbonyl derivatives may be prepared with ethyl chloroformate; longer chain substituted groups derived from stearic acid, octadecyl succinic acid or naphthoic acid may be introduced by reaction with an appropriate anhydride or by coupling the acid in presence of carbodi-imide reagents.

As with the parent insulins, zinc may be present in some form in the insulin derivatives in accordance with this invention, for example in the N,N',N''-tricarbamyl derivative. Insulin derivatives in accordance with this invention may be formulated as pharmaceutical preparations in the same way as the parent insulins and may be used clinically at comparable, greater or lower dosage levels. Thus the normal daily dosage of insulin is from 20 to 80 international units per day for adults and for resistant patients more than 200 units and in some cases over 500 units of standard insulin. The derivatives of this invention can be prepared as solutions, suspensions, or freeze-dried preparations. A typical solution formulation is a neutral or physiological pH and contains sodium acetate 0.136% w/v, sodium chloride 0.7% w/v and methyl hydroxybenzoate 0.1% w/v in pyrogen-free water.

The present invention is applicable to all insulins and particularly the porcine and bovine insulins which have been used clinically for many years in the treatment of diabetes and other disorders.

The invention is illustrated in the following Examples

EXAMPLE 1

Preparation of N,N',N''-Tricarbamyl insulin

1. Bovine zinc insulin [100 mg, Burroughs Wellcome Ltd., once crystallised, moisture content 7.09%, zinc content 0.336%, (uncorrected for loss on drying), biological activity 23.0 units per mg (uncorrected for loss on drying) assayed by mouse convulsions] in a suspension in 5 ml 0.2M-tris buffer at pH 8.5 is mixed with a solution of 5 ml of 1M potassium cyanate. The solution becomes clear within 2 minutes and incubation is continued at 30° for 8 hours.

Desalting is performed by adding the reaction mixture to a column (30 cm × 2.3 cm) of Sephadex G-25 operated with 0.01M N-ethylmorpholine acetate pH 9 as eluant. The protein containing fractions are combined, stored at room temperature for at least 1 hour and then lyophilised. The recovery of tricarbamyl insulin is 95 — 100% based on the measurement of absorption at 280 nm.

2. In a second method of preparation, a small amount of dicarbamyl derivatives is separated from tricarbamyl insulin. The carbamylation mixture is desalted as described above and submitted to gradient elution on Sephadex A-25 (100 cm × 1 cm) with a starting buffer of 0.01M-tris acetate pH 7.1 containing 8M-urea into which flows the same buffer containing 8M-urea, 0.01M-tris acetate pH 7.1 and 0.2M - NaCl, the volume of the mixing vessel is 200 ml. Protein in the column effluent is located by measurement of E280 and the major peak eluted, representing more than 80% of the initial insulin, is combined and desalted. The tricarbamyl insulin is stored in the lyophilised state.

The tricarbamyl derivative is least soluble at pH 4.0 and desalting can be achieved by precipitation at pH 4.0 instead of by gel filtration.

Characterisation of the derivative by $NH_2$-terminal analysis shows that both the A1-glycine and the B1-phenylalanine are quantitatively carbamylated. The $B_{29}$ amino group (lysine) is carbamylated as is confirmed by digestion of the derivative with trypsin (enzyme substrate ratio 1:20) at pH 9, 37°C for 4 hours: less than 0.04 residue of alanine is released from the COOH-terminus of the B-chain. The derivative is unreactive to ninhydrin confirming that the three $NH_2$-groups of insulin are blocked. The derivative gives a single band on acrylamide electrophoresis at pH 8.5 in 8M-urea.

EXAMPLE 2

Preparation of (i) $N-A_1$-Monocarbamyl insulin, (ii) $N-B_1$-Monocarbamyl insulin and (iii) $N,N'-A_1,B_1$-Dicarbamyl insulin Zinc free insulin (200 mg) is dissolved in 10 ml of 0.1M sodium phosphate of pH 7.0, and potassium cyanate (16.8 mg) is then added and the reaction mixture maintained at 30°C for 3 hours. The mixture of carbamylated derivatives is desalted on Sephadex G-25 (30 × 3cm) using 0.05M N-ethyl morpholine as eluant and lyophilised. The mixture is then separated by chromatography on Sephadex A-25 (55 × 1.5 cm) using 0.09M tris-HCl in 8M urea as eluant until 250 ml have been collected and 0.12M tris-HCl in 8M urea thereafter. The first peak emerging between 98 to 130 ml contains unreacted insulin, whilst successive peaks at 149 to 204 ml, 373 to 414 ml and 428 to 507 ml contain N-$B_1$-monocarbamyl insulin, N-$A_1$-monocarbamyl insulin and N,N'-$A_1$,$B_1$-dicarbamyl insulin, respectively. Each of the fraction is desalted on Sephadex G-25 and lyophilised.

EXAMPLE 3

Preparation of N,N',N''-Triethylcarbamyl insulin

Insulin (100 mg) is dissolved in 0.05M phosphate (20 ml) at pH 8 containing 3M-urea (the urea having been previously treated at pH 3 for 30 min. to destroy any silate present). To the stirred solution are added at 15 minute intervals three portions of ethyl isocyanate (each of 10 μl; 20 μmoles), the solution being scanned over the region 250 – 300 nm to check that no significant tyrosine modification occurs. The resultant solution is desalted by passage through Sephadex G-25 (40 × 2 cm) using 1mM N-ethyl morpholine as eluant, the protein being located in the 18th to 26th of the 3 ml fractions as indicated by the absorbance at 275 nm. These fractions are combined and lyophilised to give a white solid which is dissolved in 0.09M tris hydrochloride containing 8M-urea at pH 7.0 and applied to a column of Sephadex A-25 (16 × 1.5 cm). The column is eluted at a flow rate of 10 ml/hour first with the same buffer and then, after 250 ml of eluant have been collected, a gradient is applied to the column starting with the same buffer and terminating with 0.36 tris hydrochloride containing 8M-urea at pH 7.0, the size of the mixing vessel being 200 ml. N,N',N''-triethylcarbamyl insulin is eluted from the column after 110 ml of eluant have been collected, the eluant then being 0.18M tris hydrochloride. The fractions containing this derivative are combined, desalted on G-25 Sephadex using 1mM N-ethylmorpholine as eluant,, and lyophilised to give 31 mg of N,N',N''-triethylcarbamyl insulin.

EXAMPLE 4

Preparation of N,N',N''-Tricarbamyl tetra-O-acetyl insulin

N,N',N''-Tricarbamyl insulin (60 mg; freeze dried powder) is dissolved in 3M tris acetate (4 ml) at pH 9.2 and the solution treated portionwise with small volumes of acetic anhydride in dioxan (1:1; dioxan freed from peroxides by passage through alumina). The addition is continued until complete reaction at the tryosine hydroxyl groups is achieved as indicated by regular monitoring of the absorption spectrum of the reaction mixture, a total volume of 1.2 ml of the acetic anhydride/dioxan mixture typically being required. The resulting solution is desalted by passage through a G-25 Sephadex column at 4°C using 0.1% pyridine as eluant and the eluant lyophilised to give N,N',N''-tricarbamyl tetra-O-acetyl insulin.

In a modification of this procedure the desalting is achieved by lowering the pH of the solution to 4, centrifuging the precipitate, washing this with distilled water, dissolving the residue at pH 6 and lyophilising the solution thus obtained.

EXAMPLE 5

The procedure of Example 4 is followed but instead of proceeding to completion the reaction is terminated at intermediate stages of acetylation as indicated by the spectral monitoring. The procedure is carried out three times terminating at the 25%, 50% and 75% levels of acetylation corresponding to the mono-, di-, and tri-O-acetyl derivatives respectively.

EXAMPLE 6

The procedure of Examples 4 and 5 is followed with N,N',N''-triethylcarbamyl insulin and acetic anhydride as reactants to give N,N',N''-triethylcarbamyl mono-, di-, tri, and tetra-O-acetyl insulin.

EXAMPLE 7

Preparation of N,N',N''-Tricarbamyl tetra-O-glutaryl insulin

N,N',N''-tricarbamyl insulin (29 mg) is dissolved in 1M tris hydrochloride (pH 9.5, 1.5 ml). Powdered glutaric anhydride (110 mg) is added portionwise with vigorous stirring and the spectrum of the mixture recorded in 1 mm cuvettes. At the end of the reaction the mixture is desalted on a column of Sephadex G-25 at 4°C, the product being eluted with pyridine acetate (pH 6.5, 0.1M). The eluant is lyophilised giving a near quantitative yield of the tetraglutaryl derivative.

In a modification of this procedure the reaction is carried out in the presence of 8M-urea which opens up the tertiary structure of the molecule and as a consequence less glutaric anhydride is required to complete the reaction. Little or no undesired substitution at serine occurs in this case.

EXAMPLE 8

The procedure of Example 7 is repeated but instead of proceeding to completion the reaction is terminated, by spectral monitoring, at intermediate stages of glutarylation. The procedure is carried out three times terminating at the 25%, 50% and 75% extent of glutarylation respectively corresponding to the mono-, di- and tri-substituted derivatives.

EXAMPLE 9

The procedure of Examples 7 and 8 is followed with N,N',N''-triethylcarbamyl insulin and glutaric anhydride as reactants to give N,N',N''-triethylcarbamyl mono-, di-, tri- and tetra-O-glutaryl insulin.

EXAMPLE 10

O-carbamylation of N,N',N''-tricarbamyl insulin

N,N',N''-tricarbamyl insulin (200 g) is dissolved in 8M aqueous urea and potassium cyanate is added to a concentration of 2M. The reaction is allowed to continue at room temperature at pH 8.0 for 1 hour, pH 7.0 for 4 hours, pH 6.5 for 2 hours and then pH 6.0 for 1 hour, the pH being maintained at the required value as the experiment continues by the automatic addition of acetic acid. The reaction mixture is then acidified to pH 4.5 by the addition of hydrochloric acid, diluted fivefold with water and allowed to stand at 4°C overnight. The precipitate formed is spun off and redissolved in 0.1% aqueous pyridine acetate at pH 6.0. Desalting is effected with a column (40 × 2.5 cm) of Sephadex G-25 using 0.1% pyridine acetate at pH 6.0 as eluant, the elution being carried out at 4°C. Immediately the elution of the protein from the column is complete the fractions are combined and the product isolated in dry form by lyophilisation. The degree of carbamylation is in the region of 50% as assayed by the measurement of optical density at 280 nm. The half life of decarbamylation of the product at pH 7.4 and 37°C in physiological buffer is 75 minutes with full return of the tyrosine absorption of the tricarbamyl insulin.

In a modification of this procedure products exhibiting both higher and lower levels of carbamylation are obtained.

EXAMPLE 11

The procedure of Example 10 is followed with N,N',N''-triethylcarbamyl insulin potassium cyanate as reactants to give O-carbamylated N,N',N''-triethylcarbamyl insulins.

EXAMPLE 12

Preparation of N,N',N''-Tricarbamyl tetra-O-ethylcarbamyl insulin

N,N',N''-Tricarbamyl insulin (20 mg) is dissolved in 0.1M phosphate (2 ml) containing 8M-urea at pH 8.0. The stirred solution is treated portionwise with ethyl isocyanate (100 μl portions), the pH being automatically maintained at 8.0 by the addition of sodium hydroxide solution. Additions of ethyl isocyanate are continued until no further drop in the absorption of the solution at 280 nm occur, the addition of four 100 μportions usually being required to achieve this. The pH of the solution is then reduced to 6.0 and it is allowed to stand until no further change in absorption occurs in order to hydrolyse the carbamyl histidine derivative. The solution is desalted by passage through G-25 Sephadex (20 × 1 cm) using 1mM N-ethylmorpholine as eluant, the protein fractions being combined and lyophilised to give 18 mg of N,N',N''-tricarbamyl tetra-O-ethylcarbamyl insulin.

Example 13

The procedure of Example 12 is followed with N,N',N''-triethylcarbamyl insulin and ethylisocyanate as reactants to give N,N',N''-triethylcarbamyl tetra-O-ethylcarbamyl insulin.

EXAMPLE 14

In a modification of previous Examples other N-substituted carbamyl groups are employed in place of the carbamyl or N-ethylcarbamyl groups, e.g. N-methyl- and N-phenylcarbamyl groups, the respective reagents being N-methyl-, and N-phenylisocyanate. The use of such radicals as substituents on the amino and/or hydroxyl groups is effected using the experimental methods described hereinbefore.

EXAMPLE 15

A typical pharmaceutical preparation incorporating insulin derivatives of this invention is either a solution or suspension formulation at neutral or physiological pH containing sodium acetate 0.136% w/v, sodium chloride 0.7% w/v, and methyl hydroxybenzoate 0.1% w/v in pyrogen-free water. This may be administered to give a daily dosage of from 20 to 80 international units of standard insulin for adult patients and for resistant patients more than 200 units and even more than 500 units.

I claim:

1. An insulin in which at least one of the amino groups of the $A_1$ (glycine), $B_1$ (phenylalanine) and $B_{29}$ (lysine) amino acid units is blocked by a carbamyl substituent or a substituted carbamyl substituent of the formula $R_1R_2NCO-$ wherein $R_1$ and $R_2$ is hydrogen, lower alkyl, or phenyl and at least one of $A_{14}$, $A_{19}$, $B_{16}$ and $B_{26}$ tyrosine hydroxyl groups is substituted by acetyl, chloroacetyl, ethoxycarbonyl, glutaryl, stearyl, octadecylsuccinyl, naphthoyl, carbamyl or substituted carbamyl of the formula $R_1R_2NCO-$, wherein $R_1$ and $R_2$ are as above defined.

2. $A_1$ (Glycine), $B_1$ (phenylalanine), $B_{29}$ (lysine) N,N',N''-triethylcarbamyl insulin.

3. Substantially pure $A_1$ (glycine)-N-carbamyl insulin.

4. An insulin according to claim 1 which is $A_1$, $B_1$, $B_{29}$ - tricarbamyl mono-, di-, tri- or tetra-O-acetyl insulin.

5. An insulin according to claim 1 which is $A_1$, $B_1$, $B_{29}$-triethylcarbamyl mono-, di-, tri- or tetra-O-acetyl insulin.

6. An insulin according to claim 1 which is $A_1$, $B_1$, $B_{29}$-tricarbamyl mono-, di-, tri- or tetra-O-glutaryl insulin.

7. An insulin according to claim 1 which is $A_1$, $B_1$, $B_{29}$-triethylcarbamyl mono-, di-, tri- or tetra-O-glutaryl insulin.

8. An insulin according to claim 1 which is $A_1$, $B_1$, $B_{29}$ -tricarbamyl mono-, di-, tri- or tetra-O-carbamyl insulin.

9. An insulin according to claim 1 which is $A_1$, $B_1$, $B_{29}$ - triethylcarbamyl mono-, di-, tri- or tetra-O-carbamyl insulin.

10. An insulin according to claim 1 in which the amino acid blocking substituent is carbamyl or ethylcarbamyl and the tyrosine hydroxyl group substituent is acetyl, glutaryl, carbamyl or ethylcarbamyl.

* * * * *